(12) United States Patent
Wise

(10) Patent No.: US 7,731,205 B2
(45) Date of Patent: Jun. 8, 2010

(54) MOBILE SAW STAND BRAKE SYSTEM WA743C

(76) Inventor: Robert W. Wise, 365 Ely Rd., Petaluma, CA (US) 94954

( * ) Notice: Subject to any disclaimer, the term of this patent is extended or adjusted under 35 U.S.C. 154(b) by 432 days.

(21) Appl. No.: 11/903,241

(22) Filed: Sep. 20, 2007

(65) Prior Publication Data

US 2009/0079152 A1   Mar. 26, 2009

(51) Int. Cl.
  B62B 1/00  (2006.01)
  B62B 7/02  (2006.01)
  B62B 5/04  (2006.01)
  B62B 1/12  (2006.01)

(52) U.S. Cl. .................. 280/47.131; 280/43.1; 280/654; 280/35

(58) Field of Classification Search .................. 280/35, 280/639, 651, 652, 654, 43.1, 47.12, 47.131, 280/47.34
  See application file for complete search history.

(56) References Cited

U.S. PATENT DOCUMENTS

| | | | | |
|---|---|---|---|---|
| 2,557,183 A | * | 6/1951 | Gelles | ...................... 280/47.34 |
| 3,551,001 A | * | 12/1970 | Wilson | ..................... 280/47.34 |
| 4,230,329 A | | 10/1980 | Johnson | |
| 4,955,941 A | | 9/1990 | Rousseau | |
| 5,161,590 A | | 11/1992 | Otto | |
| 5,255,724 A | | 10/1993 | Butke | |
| 5,642,898 A | | 7/1997 | Wise | |
| 5,868,407 A | * | 2/1999 | Roese | ................... 280/47.371 |
| 6,508,479 B1 | * | 1/2003 | Tseng | ..................... 280/47.34 |
| 6,886,836 B1 | | 5/2005 | Wise | |
| 7,395,902 B2 | * | 7/2008 | D'Arca et al. | ................. 188/19 |
| 7,484,740 B2 | * | 2/2009 | Miller | .................... 280/87.021 |
| 2003/0141686 A1 | * | 7/2003 | Willis | ....................... 280/47.34 |
| 2005/0258007 A1 | * | 11/2005 | Albert | ........................ 188/2 D |

OTHER PUBLICATIONS

Rousseau SS2850 Miter Saw Stand Brochure.

* cited by examiner

*Primary Examiner*—Glenn Dayoan
*Assistant Examiner*—John R Olszewski
(74) *Attorney, Agent, or Firm*—Black Lowe & Graham PLLC

(57) ABSTRACT

A mobile saw stand brake system incorporates a pair of swing-out legs pivotally connected to a saw stand main frame. A first end of the main frame is supported on a pair of rotating wheels. A pair of brake lever arms, each having a brake shoe end and a distal actuating end, are pivotally connected to the main frame. A tension mechanism is interconnected with the pair of swing-out legs so as to actuate the brake lever arms to engage the wheels when the legs are extended in their swing-out position. The brakes are disengaged when the swing-out legs are folded into a stowed position.

20 Claims, 3 Drawing Sheets

MOBILE SAW STAND BRAKE SYSTEM
WA743C

TECHNICAL FIELD

The invention relates to mobile stands for tools. More specifically, the invention relates to mobile stands for power tools.

BACKGROUND OF THE INVENTION

Portable, wheeled tool carts have been available for some time. Once such prior art tool cart is shown and described by Wise, the inventor herein, in U.S. Pat. No. 5,642,898 issued Jul. 1, 1997. Additional tool carts have been described in the patent literature. For instance, U.S. Pat. No. 4,955,941, issued Sep. 11, 1990, to Rousseau, describes a support table for a bench saw. U.S. Pat. No. 4,230,329, issued Oct. 28, 1980 to Johnson, describes a mobile cart. U.S. Pat. No. 5,161,590, issued Nov. 10, 1992, to Otto, describes a miter saw table apparatus. U.S. Pat. No. 5,255,724; issued Oct. 26, 1993, to Butke, describes an adjustable extension assembly. A brochure showing the Rousseau SS2850 product discloses a mobile miter saw stand.

Nevertheless, a need existed for a mobile saw stand that enabled an end user to transport common electrically powered table saws and the like to the location of the project being undertaken, wherein the mobile saw stand quickly folded out into a fully supporting workbench for actual use of the saw and/or similar equipment. The inventor herein conceived the counterbalanced universal mobile saw stand disclosed in U.S. Pat. No. 6,886,836 issued on May 3, 2005 to address that need, among others. The saw stand disclosed therein is currently manufactured under the brand name Ridgid® and has been commercially successful.

The counterbalanced, universal mobile saw stand disclosed in the '836 patent has a substantially handtruck-shaped main frame having a pair of wheels rotatably attached to the main frame in the vicinity of a foot portion of the main frame. The foot portion extends transversely from one end of the main frame in a fashion similar to a two-wheel hand truck. A second distal end of the main frame adjacent the user's hands has a pair of swing-out legs pivotally connected to the main frame so as to support the main frame in an extended position. A swing-out table is also pivotally attached to the main frame adjacent to the pivotal connection with respect to the swing-out support legs. The table supports a table saw, chop saw, sliding compound miter saw, jig saw, or the like at an elevated working position. The swing-out table is itself supported by a swing-out bed support that has a lower end pivotally connected to the main frame adjacent to the wheels, and an upper end that resides in a pair of tracks on the underside of the table such that, when the mobile saw stand is extended into its upright position, the table is continuously slidably supported by the movable bed support during erection so as to not endanger the user from inadvertent collapse. The saw stand is typically provided with a counterbalanced, telescoping spring to reduce the load on the table and facilitate erection of the table into the extended position.

One possible problem with saw stands of the type disclosed in the '836 patent, and other similar saw stands, is that when used with power tools employing large induction motors, such as used in some table saws, the stand may lurch in reaction to the high instantaneous torque applied by the induction motor. In addition, vibrations from a miter saw, sliding compound saw, or the like may be transmitted to the wheels of the mobile saw stand causing the saw stand to "walk" about slightly on a smooth surface, such as a hardwood floor. While these tendencies may be alleviated by placing blocks under the wheels at an unimproved construction site, such blocking frequently is ineffective on smooth surfaces, such as hardwood or tile floors. One possible solution to this problem is the use of so-called foot operated jacks in which a foot pedal activates a lever arm to lift an associated wheel off the ground. Such mechanisms are commonly found in typewriter tables. However, self-jacking apparatus are generally not well adapted for use with mobile saw stands because of the greater weight of power tools compared to typewriters.

Therefore, a need exists for a mobile saw stand system that prevents movements of the saw stand wheels while a table saw, chop saw, or other power tool is in operation on the saw stand.

SUMMARY OF THE INVENTION

It is therefore an object of the present invention to provide a mobile saw stand brake system that prevents movements of mobile saw stand wheels while a table saw, chop saw, or other power tool is in operation on the saw stand.

It is a further object of the present invention to provide for a mobile saw stand brake system that is automatically actuated upon erection of the mobile saw stand to an extended working position.

It is yet another object of the present invention to provide a mobile saw stand brake system, which achieves the above objects and which also automatically deactivates the brake system when the mobile saw stand is converted to a collapsed configuration.

The invention achieves the above objects, and other objects and advantages that will become apparent from the description which follows, by providing a mobile saw stand brake system incorporating an elongated main frame terminating at a first end in a transversely directed foot portion. A pair of wheels are preferably provided, each wheel having an external periphery and being rotatably connected to the main frame adjacent the first end. In its broadest context, a swing-out leg frame is pivotally connected to the main frame at an end distal from the first end so as to be movable between a stowed, closed position and an extended support position. A brake lever arm having a brake shoe end and a distal actuating end so as to define a midsection therebetween, is pivotally connected to the main frame such that the brake shoe end is adjacent to a wheel periphery for engagement therewith. A force-transferring mechanism is connected to the main frame and the swing-out leg frame so as to actuate the brake lever arm whenever the leg frame is moved from the stowed, closed position to the extended support position. In this manner, when the swing-out leg frame is moved to the extended position, the brake lever arm is actuated so as to engage the wheel periphery and rolling of the mobile saw stand is prevented. The brake lever arm is preferably automatically deactivated whenever the leg frame is returned to the stowed, closed position. In this manner, when the swing-out leg frame is moved to the extended position, the brake lever arm is actuated so as to engage the wheel periphery and rolling of the mobile saw stand is prevented.

In preferred embodiments of the invention, a brake lever arm and force-transferring mechanism are provided for each wheel and the brake lever arms are substantial mirror images of one another. A pair of spring or other bias mechanisms may be incorporated into the force-transferring mechanism so as to provide some elasticity to the force-transferring mechanism to prevent the mechanism from "locking up". One preferred embodiment for implementing the force-transferring mechanism is a conventional tension cable and cable housing, wherein the cable housing is connected to the main frame, and one end of the cable is connected to the swing-out leg frame, while the other end of the cable is attached to the brake lever arm. A second bias mechanism can be included in the system to return the brake lever arm(s) to its/their quiescent nonactuating position.

DETAILED DESCRIPTION OF THE PREFERRED EMBODIMENTS

Figure 1:
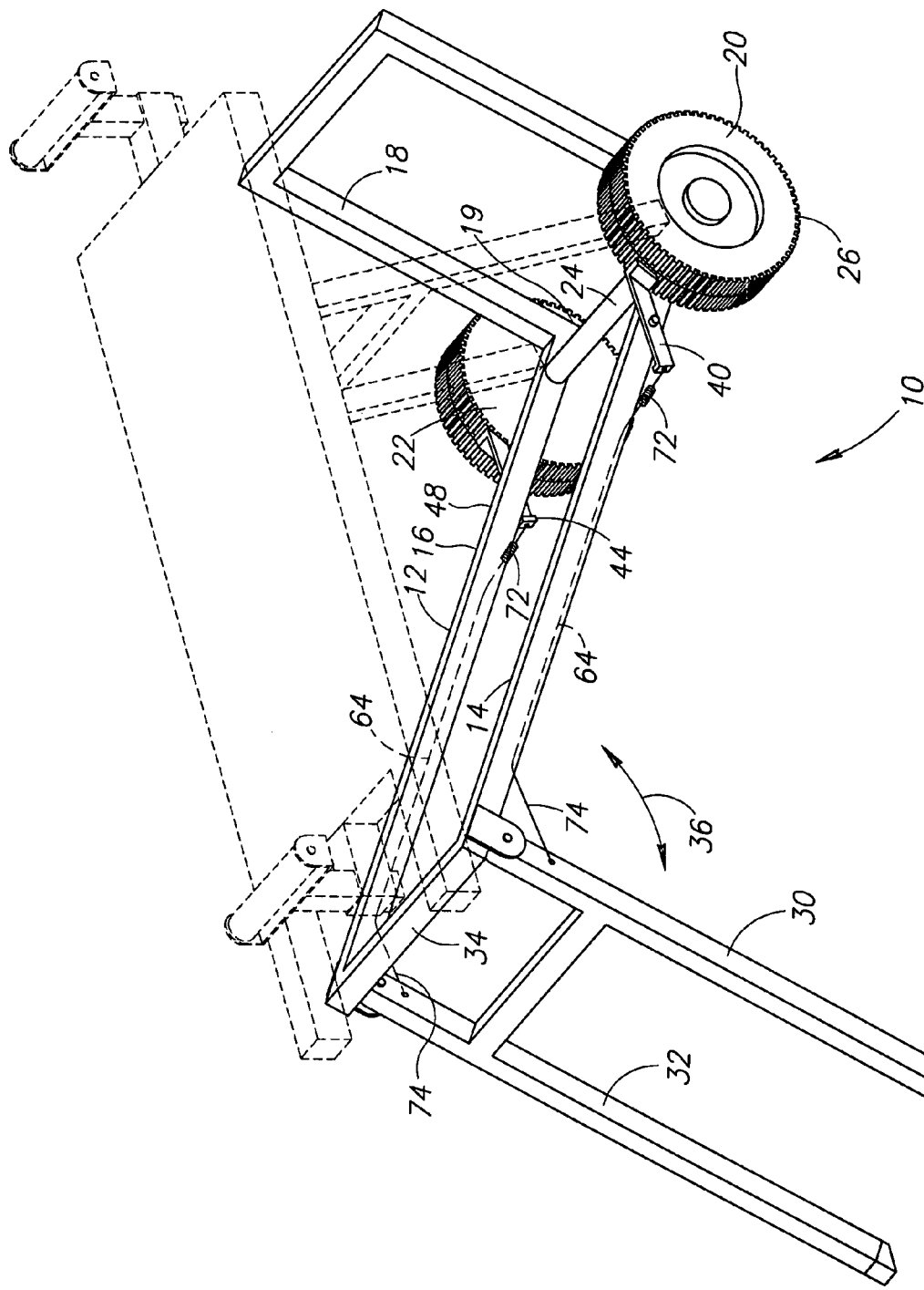
FIG. 1 is a perspective view of a portion of a universal mobile saw stand incorporating the brake system of the present invention.

A mobile saw stand brake system in accordance with the principles of the invention is generally indicated at reference numeral 10 in the various Figures of the attached drawings, wherein numbered elements in the Figures correspond to like numbered elements herein. FIG. 1 illustrates a portion of a mobile saw stand for use with table saws, chop saws, sliding compound miter saws, or other power tools, those portions of the saw stand not interacting with elements of the brake system 10 having been shown in phantom lines. A typical prior art counterbalanced universal mobile saw stand is disclosed in U.S. Pat. No. 6,886,836 issued May 3, 2005 to Wise, the inventor herein. The disclosure of that patent is incorporated herein by reference. The portion of the mobile saw stand shown in FIG. 1 incorporates a conventional handtruck-shaped main frame 12 including a right frame rail 14 and a parallel left frame rail 16. The frame rails 12, 14 are spaced apart and parallel, terminating in a transversely directed foot portion 18 at a first end 19 of the main frame 12 and at a generally right angle with respect thereto. A pair of wheels 20, 22 are rotatably connected to outsides of the frame rails 14, 16 by an axle 24 adjacent the first end 19 of the main frame. The wheels have external peripheries 26, 28 to rotatably support the mobile saw stand on a support surface (not shown) such as the ground in the conventional manner.

A pair of swing-out legs 30, 32 are connected to the main frame at a distal end 34 from the first end 19. The swing-out legs provide support for the main frame 12 in the conventional manner and may include locking mechanisms (not shown) to support the main frame in an extended position so as to present a swing-out table support (shown in phantom lines) in an extended, working position. In this preferred embodiment, movement of the swing-out legs 30, 32 from a stowed position indicated by arrow 36 to the extended position actuates the brake system 10 so as to prevent the wheels 26, 28 from rolling, as will be described further hereinbelow. In addition, collapsing the swing-out legs 30, 32 from the extended position shown in FIG. 1, to the closed, stowed position (not shown) deactivates the brake system 10, as will also be described further hereinbelow.

Figure 2:
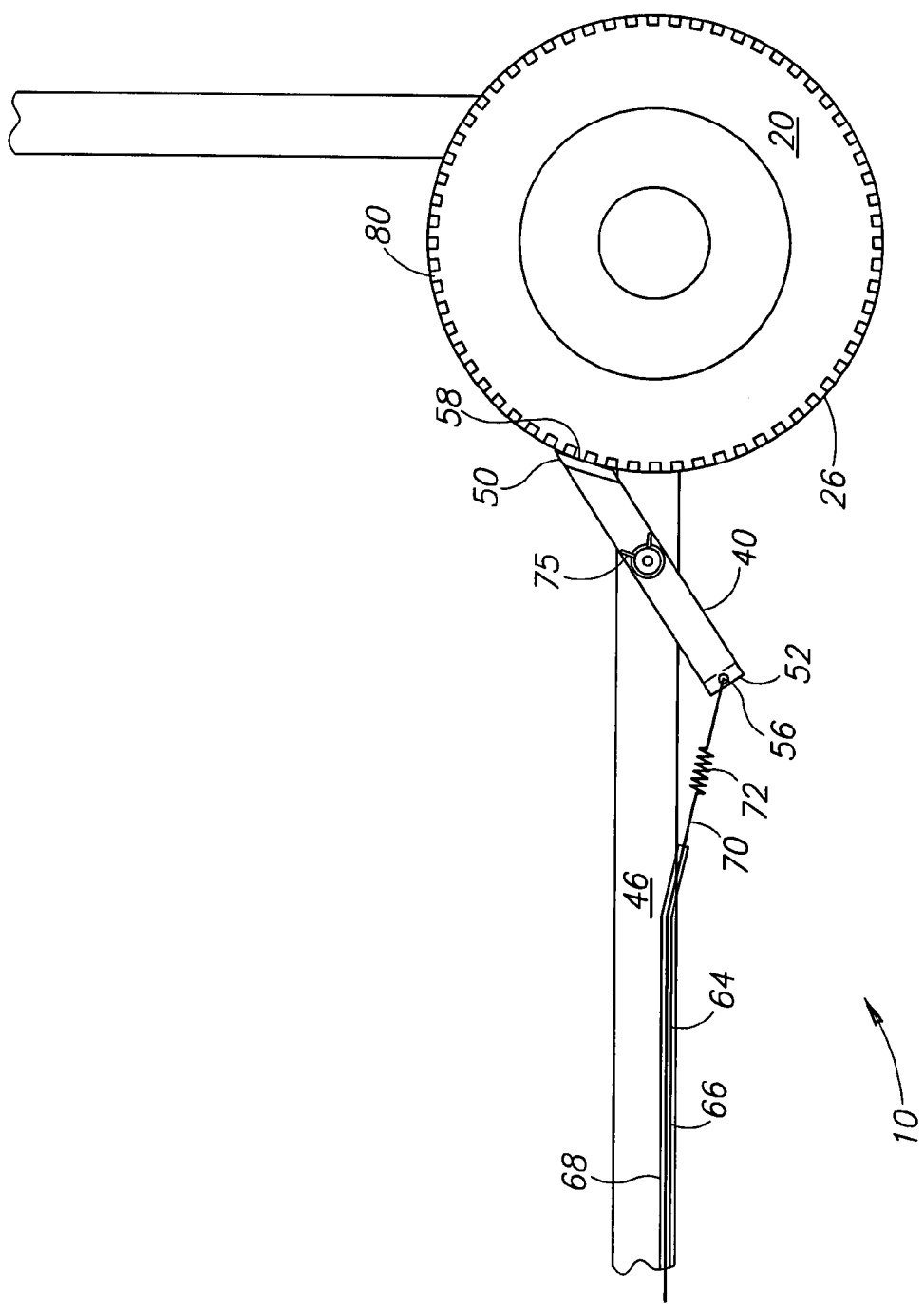
FIG. 2 is a partial side elevational view of the mobile saw stand portion illustrating the interaction of a wheel and a brake lever arm of the invention.
Figure 4:
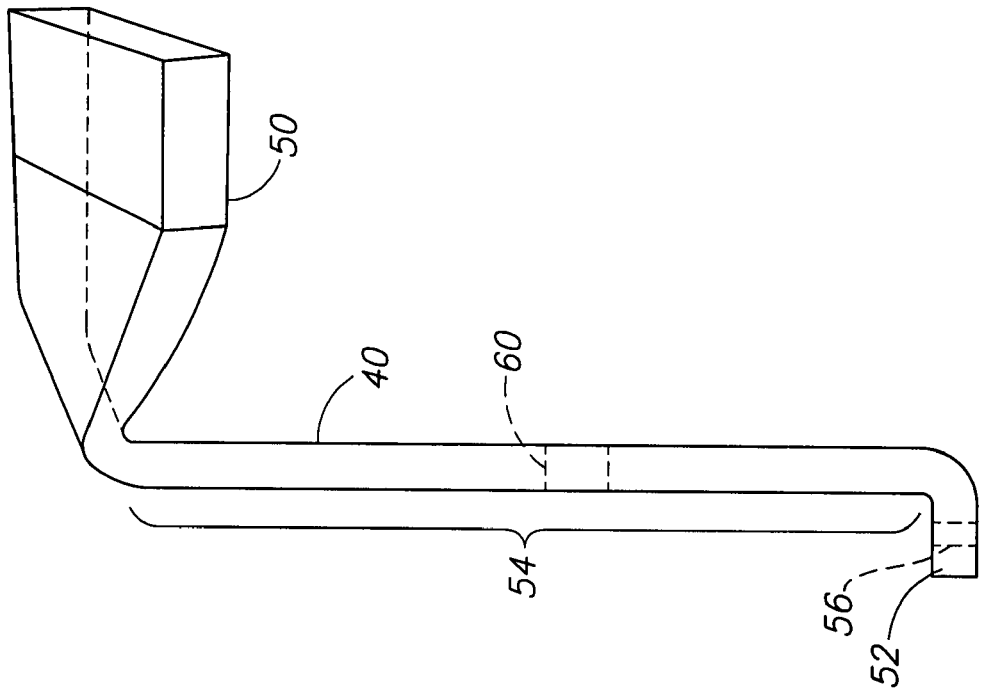
FIG. 4 is a front elevational view of the brake lever arm of FIG. 3.
Figure 3:
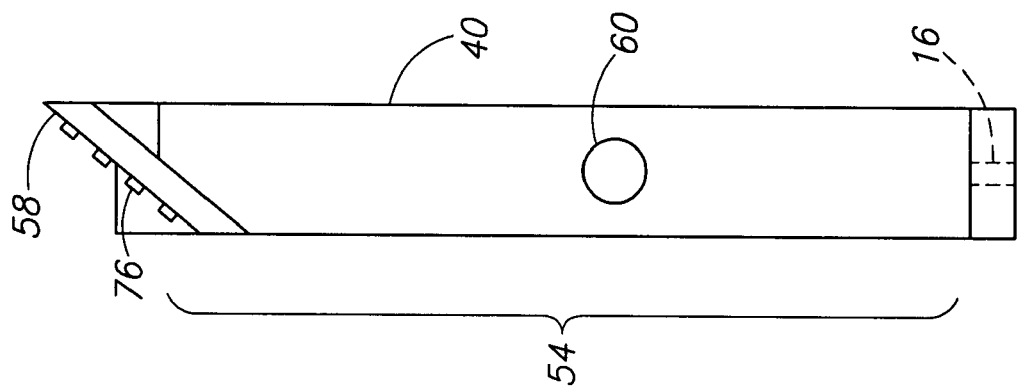
FIG. 3 is a side elevational view of an exemplary brake lever arm of the present invention.

As best seen in the remaining FIGS. 2, 3, and 4, the brake system 10 is provided with a pair of brake lever arms 40, 44 that are pivotally connected to outer sides 46, 48 of the main frame rails 14, 16, respectively. Each brake lever arm has a brake shoe end 50 and a distal actuating end 52 defining a midsection 54 therebetween. Each brake lever arm is preferably manufactured from a strip of mild steel approximately 0.190 inch thick. The actuating end 52 is bent at an approximate 90-degree angle with respect to the midsection and defines a bore 56 for purposes that will be described hereinbelow. The brake shoe end 50 is preferably formed by bending that end of the brake lever arm through a 90-degree angle and then twisting the result through approximately 50 degrees such that a face 58 of the brake shoe end 50 is at an approximate 140-degree angle with respect to the midsection 54, as best seen in FIGS. 3 and 4. The midsection 54 is preferably provided with a central mounting aperture 60 so that the brake shoes can be mounted to the frame rails 14, 16 such as by a conventional nut and bolt (not shown). It will be apparent to those of ordinary skill in the relevant art that the brake shoes 40, 44, as described, present the face 58 of each brake shoe in an essentially tangential relationship to the peripheries 26, 28 of the wheels 20, 22, as best seen in FIG. 2. In addition, the actuating ends 52 present an opportunity to apply a torque about the bores 56 so as to urge the brake shoe faces 58 against the peripheries of the wheels when the brake shoes are rotated appropriately as shown in FIG. 2. To this end, the brake system 10 is provided with a tension mechanism 64 in the form of a conventional tension cable 66 housed within a conventional cable housing or guide 68. Each cable guide 68 is connected, such as by welding or clamps (not shown), to the respective outer sides 46, 48 of the main frame rails 14, 16. A lower end 70 of each cable 66 is elastically connected to the brake lever arm actuating end 52, such as by a conventional coil spring 72, so as to prevent the cable 66 from "locking up" inter alia when the cable 66 is tensioned, as will be described further hereinbelow. An upper end 74 of each cable is connected to a respective one of the swing-out legs 30, 32 adjacent the distal end 34 of the main frame 12. Thus, moving the swing-out legs 30, 32 to the extended position, as shown in FIG. 1, tensions each cable 66 within each cable housing 68 and the springs 72, thus rotating the brake lever arms 40, 44 so as to urge the brake shoe ends 50 against the wheel peripheries 26, 28. In this way, the mobile saw stand in FIG. 1 is discouraged from rolling due to vibrations of a power saw, starting a power saw, or the like on the mobile saw stand bed (shown in phantom lines).

The invention advantageously employs a plurality of parallel, transverse ridges 76 on the face 58 of each brake shoe end 50. The ridges 58 engage corresponding axially directed treads 80 on the peripheries 26, 28 of each wheel 20, 22 so as to increase the coefficient of friction between the brake shoes and the wheels and thus positively engage the wheels against rolling.

The invention advantageously employs a pair of torsion springs 75 to urge the brake lever arms 40, 44 to a quiescent position so as to disengage with the wheels 20, 22 as when the swing-out legs 30, 32 are in the stowed positions (not shown). Thus, upon collapsing the swing-out legs 30, 32 from the extended position to the collapsed position, the brake lever arms 40, 44 automatically assume the quiescent, disengaged position.

Those of ordinary skill in the art will conceive of other alternate embodiments of the invention upon reviewing this disclosure. Thus, the invention is not to be limited to the above description, but is to be determined in scope by the claims which follow.

I claim:

1. A mobile saw stand brake system, comprising:
a substantially handtruck-shaped main frame having a pair of elongated, laterally coextensive spaced-apart frame rails terminating at a first end in a transversely directed foot portion;
a pair of wheels each having an external periphery and being rotatably connected to the main frame adjacent to the first end;
a pair of swing-out legs pivotally connected to the main frame at a distal end from the first end so as to be movable between a stowed, closed position and an extended support position;
a pair of brake lever arms each having a brake shoe end and a distal actuating end defining a midsection therebetween, the midsection of each lever arm being pivotally connected to the main frame such that the brake shoe ends are proximal to the wheel peripheries for engagement therewith; and,
tension means connected to the main frame and the swing-out legs for actuating the brake lever arms when the legs are moved to the extended support position whereby the wheels are substantially prevented from rolling.

2. The mobile saw stand brake system of claim 1, wherein the brake lever arm midsections are pivotally connected to the main frame rails.

3. The mobile saw stand brake system of claim 2, wherein the brake lever arm midsections are pivotally connected to lateral outsides of the main frame rails.

4. The mobile saw stand brake system of claim 3, wherein the brake lever arms are substantially mirror images of one another.

5. The mobile saw stand brake system of claim 1, including bias means for biasing the brake lever arms to a quiescent position.

6. The mobile saw stand brake system of claim 5, wherein the biasing means includes a pair of torsion springs.

7. The mobile saw stand brake system of claim 1, wherein the wheels rotate about a common axis and each wheel periphery has axially directed treads and each brake shoe end has cooperatively shaped axially directed ridges for engagement with the wheel treads.

8. The mobile saw stand brake system of claim 1, wherein the main frame rails are substantially parallel to one another.

9. The mobile saw stand brake system of claim 1, wherein the tension means includes a pair of cable guides connected to the main frame and a pair of cables within the cable guides, each cable having a lower end connected to a corresponding one of the lever arm actuating ends and an upper end connected to a corresponding one of the swing-out legs at a position adjacent to the distal end so that moving the swing-out legs from the stowed position to the extended position tensions the cable and actuates the brakes.

10. The mobile saw stand brake system of claim 9, wherein the tension means further includes an elastic member connected to each cable so as to provide each cable with a substantial coefficient of elasticity.

11. A mobile saw stand brake system, comprising:
an elongated main frame terminating at a first end in a transversely directed foot portion;
a pair of wheels each having an external periphery and being rotatably connected to the main frame adjacent to the first end;
a swing-out leg frame pivotally connected to the main frame at an end distal from the first end so as to be movable between a stowed, closed position and an extended support position; and,
a brake lever arm having a brake shoe end and a distal actuating end defining a midsection therebetween, the midsection being pivotally connected to the main frame such that the brake shoe end is proximal to one of the wheel peripheries for engagement therewith; and,
force transferring means connected to the main frame and the swing-out leg frame for actuating the brake lever arm when the leg frame is moved to the extended support position whereby one of the wheels is substantially prevented from rolling.

12. The mobile saw stand brake system of claim 11, wherein the brake lever arm midsection is pivotally connected to the main frame between the first and distal ends.

13. The mobile saw stand brake system of claim 12, wherein the brake lever arm midsection is pivotally connected to lateral outside of the main frame.

14. The mobile saw stand brake system of claim 13, wherein the brake lever arm has an approximately 140-degree twist at the brake shoe end.

15. The mobile saw stand brake system of claim 11, including bias means for biasing the brake lever arm to a quiescent position.

16. The mobile saw stand brake system of claim 15, wherein the biasing means includes a torsion spring.

17. The mobile saw stand brake system of claim 11, wherein the wheels rotate about a common axis and a wheel periphery has axially directed treads and the brake shoe end has a cooperatively shaped, axially directed ridge for engagement with the wheel treads.

18. The mobile saw stand brake system of claim 11, wherein the main frame has a pair of rails substantially parallel to one another.

19. The mobile saw stand brake system of claim 11, wherein the force-transferring means includes a cable guide connected to the main frame and a cable within the cable guide, the cable having a lower end connected to the lever arm actuating end and an upper end connected to the swing-out leg frame adjacent to the distal end so that moving the swing-out leg frame from the stowed position to the extended position tensions the cable and actuates the brake.

20. The mobile saw stand brake system of claim 19, wherein the force transferring means further includes an elastic member connected to the force transferring means so as to provide the force transferring means with a substantial coefficient of elasticity.

* * * * *